US 11,855,504 B2

(12) United States Patent
Kim

(10) Patent No.: US 11,855,504 B2
(45) Date of Patent: Dec. 26, 2023

(54) MOTOR

(71) Applicant: LG INNOTEK CO., LTD., Seoul (KR)

(72) Inventor: Tae Bum Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 413 days.

(21) Appl. No.: 17/294,767

(22) PCT Filed: Nov. 25, 2019

(86) PCT No.: PCT/KR2019/016224
§ 371 (c)(1),
(2) Date: May 18, 2021

(87) PCT Pub. No.: WO2020/122462
PCT Pub. Date: Jun. 18, 2020

(65) Prior Publication Data
US 2021/0408861 A1   Dec. 30, 2021

(30) Foreign Application Priority Data
Dec. 11, 2018   (KR) .......................... 10-2018-0159237

(51) Int. Cl.
*H02K 3/50* (2006.01)
*H02K 3/28* (2006.01)
(Continued)

(52) U.S. Cl.
CPC .................. *H02K 3/50* (2013.01); *H02K 3/28* (2013.01); *H02K 3/34* (2013.01); *H02K 5/225* (2013.01); *H02K 2203/09* (2013.01)

(58) Field of Classification Search
CPC ............. H02K 3/50; H02K 3/34; H02K 5/225
See application file for complete search history.

(56) References Cited

U.S. PATENT DOCUMENTS 9,024,500 B2   5/2015   Kimura et al.
11,152,824 B2 *  10/2021   Hong ....................... H02K 5/22
(Continued)

FOREIGN PATENT DOCUMENTS

EP   2 278 689 A1   1/2011
JP   2002-153003   5/2002
(Continued)

OTHER PUBLICATIONS

International Search Report dated Mar. 31, 2020 issued in Application No. PCT/KR2019/016224.
(Continued)

*Primary Examiner* — Robert W Horn
(74) *Attorney, Agent, or Firm* — KED & ASSOCIATES, LLP

(57) ABSTRACT

The present invention provides a motor comprising: a shaft; a rotor coupled to the shaft; a stator arranged on the outer side of the rotor; and a terminal arranged on the stator. The stator comprises: a stator core; an insulator coupled to the stator core; and a coil wound on the insulator, wherein the insulator comprises a body on which the coil is wound, and a connector connected to the body. The terminal comprises: an extension arranged in the circumferential direction of the insulator, a pin portion at an end of the extension, and a hook portion at the opposite end of the extension. The coil comprises one continuous wire. The body comprises a first body and a second body, the coil being wound on the first body, passing through the hook portion, and wound on the second body. The hook portion is electrically connected to a portion of the coil, wherein the portion passes through the hook portion.

20 Claims, 5 Drawing Sheets

(51) Int. Cl.
*H02K 3/34* (2006.01)
*H02K 5/22* (2006.01)

(56) References Cited

U.S. PATENT DOCUMENTS

| | | | | |
|---|---|---|---|---|
| 2009/0200879 | A1 | 8/2009 | Ghodsi-Khameneh et al. | |
| 2011/0068647 | A1* | 3/2011 | Sakaue | H02K 3/28 310/71 |
| 2017/0310183 | A1* | 10/2017 | Jang | H02K 5/22 |
| 2019/0140496 | A1* | 5/2019 | Hong | H02K 5/22 |
| 2021/0408861 | A1* | 12/2021 | Kim | H02K 3/50 |

FOREIGN PATENT DOCUMENTS

| | | |
|---|---|---|
| JP | 2007-288944 | 11/2007 |
| JP | 2008-278704 | 11/2008 |
| JP | 2008-289325 A | 11/2008 |
| JP | 2012-213275 | 11/2012 |
| JP | 2015-192553 | 11/2015 |
| KR | 10-0706193 | 4/2007 |
| KR | 100 706 193 B1 | 4/2007 |
| KR | 10-2011-0005868 | 1/2011 |
| KR | 10-2015-0038872 | 4/2015 |
| KR | 2016-0067338 A | 6/2016 |
| KR | 10-2017-0122486 | 11/2017 |
| WO | WO 2009/060600 | 5/2009 |
| WO | WO 2017/188659 A1 | 11/2017 |

OTHER PUBLICATIONS

Extended European Search Report dated Jul. 8, 2022 issued in Application 19894887.9.
Korean Office Action dated Jul. 14, 2023 issued in Application No. 10-2018-0159237, The document is in Korean, so the examiner could not read it.
Japanese Office Action dated Oct. 3, 2023, issued in Application No. JP 2021-531793.

* cited by examiner

[FIG. 1]
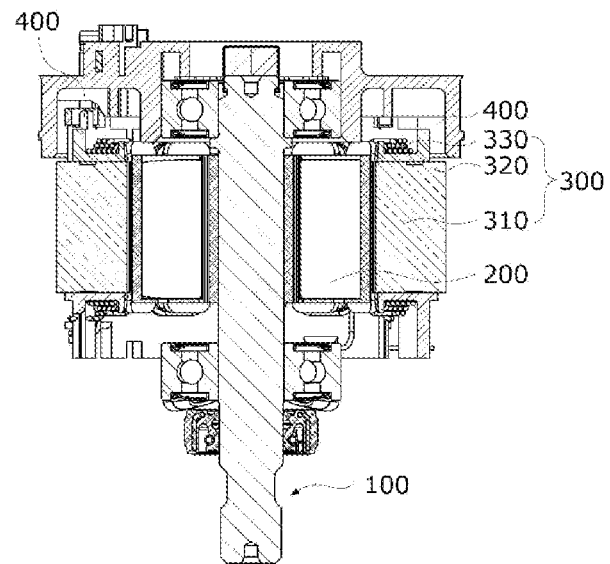
[FIG. 2]
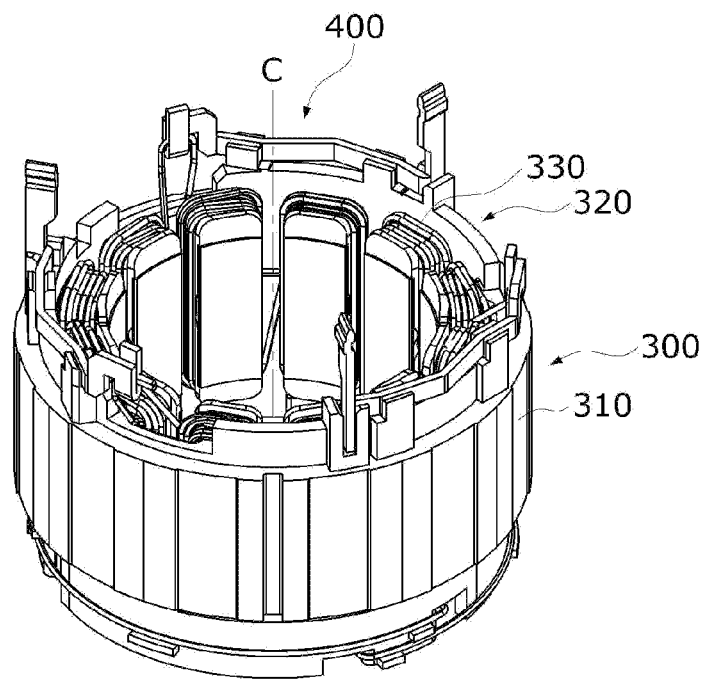

[FIG. 3]
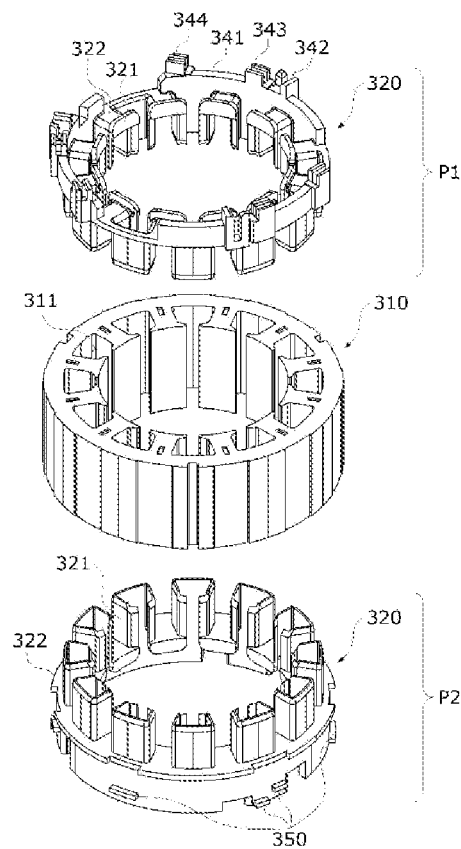
[FIG. 4]
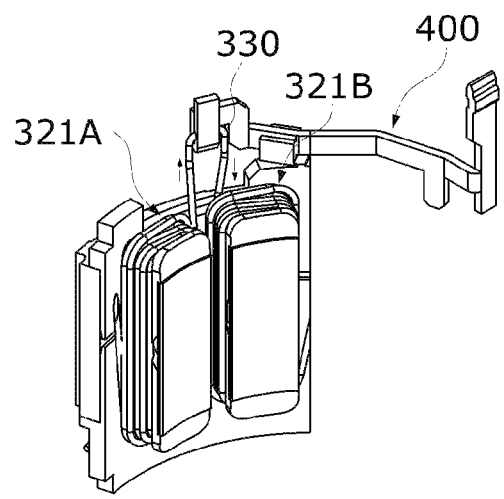

[FIG. 5]
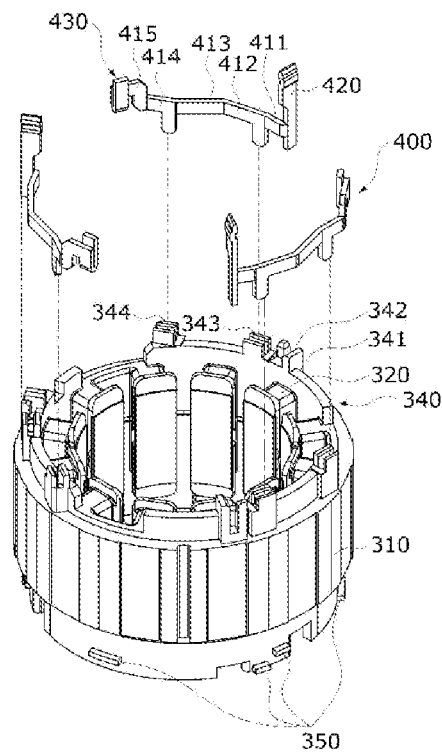
[FIG. 6]
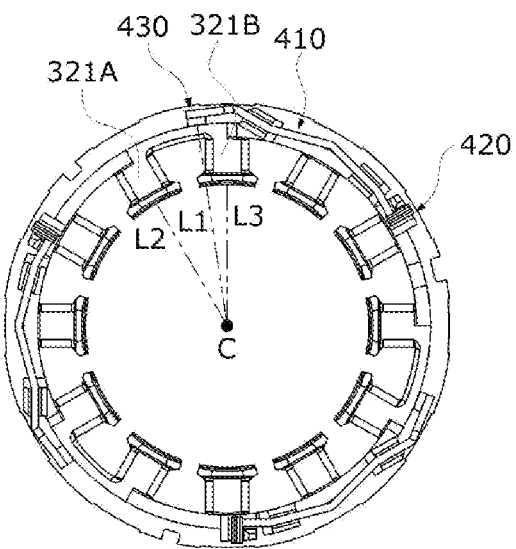

[FIG. 7]
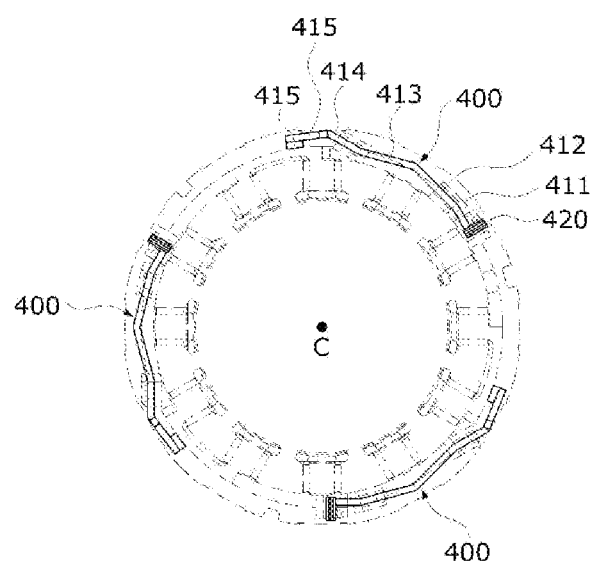
[FIG. 8]
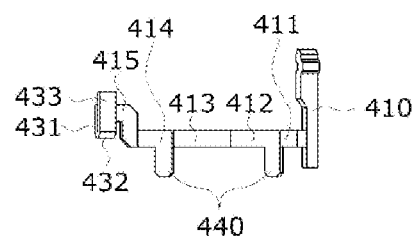
[FIG. 9]
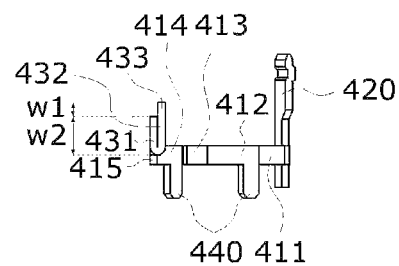

[FIG. 10]
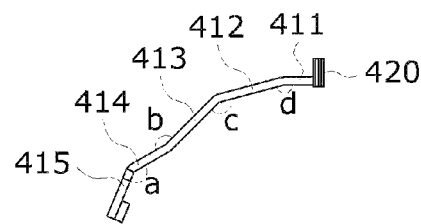

MOTOR

CROSS-REFERENCE TO RELATED PATENT APPLICATIONS

This application is a U.S. National Stage Application under 35 U.S.C. § 371 of PCT Application No. PCT/KR2019/016224, filed Nov. 25, 2019, which claims priority to Korean Patent Application No. 10-2018-0159237, filed Dec. 11, 2018, whose entire disclosures are hereby incorporated by reference.

TECHNICAL FIELD

The present invention relates to a motor.

BACKGROUND ART

A motor includes a shaft, a rotor, and a stator. The stator includes a plurality of teeth. An insulator is provided on the teeth for insulation. A coil is wound around the insulator. After winding the coil, a position of a start end and a position of a termination end of the coil are arranged for fusing. In this case, in a state in which the start end and the termination end of the coil are fixedly hooked on terminals adjacent thereto, a fusing operation is performed, and an operation of hooking the start end and the termination end on the terminals is performed manually. In addition, there is cumbersomeness in arranging the positions of the ends with the positions of the terminals before the coil is hooked thereon.

Accordingly, this becomes an obstacle to automation in manufacturing the motor and causes quality degradation of the fusing.

Technical Problem

The present invention is directed to providing a motor allowing an arrangement of a coil to be facilitated in a coil fusing process and an operation of hooking the coil on a terminal to be automated.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, a stator disposed outside the rotor, and a terminal disposed on the stator, wherein the stator includes a stator core, an insulator coupled to the stator core, and a coil wound around the insulator, the insulator includes a body portion around which the coil is wound and a connector connected to the body portion, the terminal includes an extension disposed in a circumferential direction of the insulator, a pin disposed on one end of the extension, and a hook disposed on the other end of the extension, the coil is provided as one continuous wire, the body portion includes a first body portion and a second body portion, the coil is wound around the first body portion, passes through the hook, and is wound around the second body portion, and the hook is electrically connected to a region of the coil passing through the hook.

The terminal may overlap the stator core in a shaft direction.

The extension may include a first bent piece connected to the pin, a second bent piece which is bent and extends inward from the first bent piece, a third bent piece which is bent and extends inward from the second bent piece, a fourth bent piece which is bent and extends outward from the third bent piece, and a fifth bent piece which is bent and extends upward from the fourth bent piece.

The number of the terminals may be three, and the terminals may be disposed to be spaced apart from each other at angular intervals of 120° around a stator center (C).

The first body portion and the second body portion may be disposed adjacent to each other, and a reference line (L1) connecting a stator center (C) and a width center of the hook may be disposed between a reference line (L2) connecting the stator center (C) and a width center of the first body portion and a reference line (L3) connecting the stator center (C) and a width center of the second body portion.

The hook may be disposed to be closer to the second body portion than the first body portion.

A width of the hook may be greater than a thickness of the hook in a radial direction.

The hook may include a first region extending from a lower end of the extension, a second region bent upward from the first region, and a third region which extends from the second region and has an end positioned to be higher than an upper surface of the extension.

A lower end of the second region may be positioned to be higher than the lower end of the extension.

The region of the coil may be disposed on the second region.

The region of the coil may be fused to the second region.

The terminal may include a coupling portion disposed to be perpendicular to the extension, and the body may include a plurality of grooves in which the coupling portion is disposed.

The insulator may include a guide having an opening at an upper side of the guide, and the terminal may be disposed in the guide.

The guide may include a body disposed on an upper surface of the insulator, a first boss which is disposed at an upper side of the body and in which the pin is disposed, a second boss which is spaced apart from the first boss and in which the second bent piece is disposed, and a third boss which is spaced apart from the second boss and in which the fourth bent piece is disposed.

The terminal may include at least two coupling portions vertically extending from a lower side of the extension, and the body may include at least two grooves in which the coupling portions are disposed.

The plurality of coupling portions may be spaced apart from each other in a circumferential direction, and at least one of boundaries between the first bent piece and the second bent piece, between the second bent piece and the third bent piece, and between the third bent piece and the fourth bent piece may be disposed between the plurality of coupling portions in the circumferential direction.

Each of the plurality of coupling portions may extend from one of the second bent piece and the fourth bent piece.

The third boss may be disposed toward an outside in a direction toward the hook.

The insulator may include a plurality of protrusions protruding from an outer circumference of the insulator in a radial direction.

The coil may be disposed along the outer circumference of the insulator, and the coil may be disposed on the outer circumference of the insulator to form a plurality of rows in a shaft direction.

The protrusions may support a lower end of the coil, and the protrusions may be disposed to form a plurality of stages in the shaft direction to correspond to the rows of the coil.

A length of the protrusion in the radial direction may be greater than a diameter of the coil.

Advantageous Effects

According to embodiments, since a coil is fused in a state in which the coil is hooked on a terminal, an additional process for arranging positions of the coil and the terminal can be omitted.

Since a structure of a portion, through which the coil passes, of the terminal is improved, the coil can be prevented from leaving the terminal in a centrifugal direction.

The terminal can be restricted from moving in the centrifugal direction by a plurality of coupling portions, and a bent portion of the extension is hooked on a guide so that the terminal can be restricted from moving in a circumferential direction.

DESCRIPTION OF DRAWINGS

FIG. 1 is a view illustrating a motor according to an embodiment.

FIG. 2 is a perspective view illustrating a stator and a terminal illustrated in FIG. 1.

FIG. 3 is an exploded perspective view illustrating a stator core and an insulator.

FIG. 4 is a view illustrating a coil passing from a first body portion to a second body portion.

FIG. 5 is an exploded perspective view illustrating the stator and the terminal.

FIG. 6 is a plan view illustrating the stator and the terminal.

FIG. 7 is a plan view illustrating a layout of the terminal.

FIG. 8 is a side view illustrating the terminal.

FIG. 9 is a front view illustrating the terminal.

FIG. 10 is a plan view illustrating the terminal.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having meanings customary to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a view illustrating a motor according to an embodiment, and FIG. 2 is a perspective view illustrating a stator and a terminal illustrated in FIG. 1.

Referring to FIGS. 1 to 3, the motor according to the embodiment may include a shaft 100, a rotor 200, a stator 300, and a terminal 400.

The shaft 100 may be coupled to the rotor 200. When an electrical interaction occurs between the rotor 200 and the stator 300 by supplying a current, the rotor 200 is rotated, and the shaft 100 is rotated in conjunction with the rotor 200. The shaft 100 may be connected to a steering shaft of a vehicle and may transmit power to the steering shaft.

The rotor 200 is rotated due to the electrical interaction with the stator 300.

The rotor 200 may include a rotor core and magnets. The rotor core may be formed in a form in which a plurality of circular thin steel plates are stacked or in a single cylindrical form. A hole to which the shaft 100 is coupled may be formed in a central portion of the rotor core. The magnets may be disposed on a circumferential surface or in an inner portion of the rotor core.

The stator 300 is disposed outside the rotor 200. The stator 300 may include a stator core 310, an insulator 320, a coil 330, and a guide 340, and a protrusion 350.

FIG. 3 is an exploded perspective view illustrating the stator core and the insulator, and FIG. 4 is a view illustrating the coil passing from a first body portion to a second body portion.

Referring to FIGS. 3 and 4, a plurality of pockets 311 spaced apart from each other are disposed in the stator core 310 in a circumferential direction. The insulator 320 may be installed on the pocket 311 from above and below.

The insulator 320 is installed on the stator core 310. The insulator 320 may include an upper part P1 and a lower part P2. The upper part P1 may be installed on the stator core 310 from above, and the lower part P2 may be installed on the stator core 310 from below. The insulator 320 may include a body portion 321 and a connector 322.

The coil 330 is wound around the body portion 321. The body portion 321 is provided as a plurality of body portions 321. The single coil 330 is wound around the plurality of body portions 321. In this case, the body portions 321 include a first body portion 321A and a second body portion 321B. The first body portion 321A may be provided as a plurality of first body portions 321A. The first body portions 321A are spaced apart from each other at equal intervals. In addition, the second body portion 321B is disposed adjacent to the first body portion 321A.

First, the coil 330 is wound around the body portion 321 adjacent to the first body portion 321A. When the winding is completed, the coil 330 is wound around the first body portion 321A. In addition, the coil 330 passes through the terminal 400 and is wound around the second body portion 321B.

In this case, power with three phases may be applied to the coil 330. The coil 330 is divided into a first phase coil, a second phase coil, and a third phase coil. In this case, contact points of any two selected among the first phase coil, the second phase coil, and the third phase coil are in contact with the terminal 400.

The guide 340 is disposed on the insulator 320. The guide 340 includes an opening at an upper side thereof. The terminal 400 is disposed in the opening. The guide 340 may include a body 341, a first boss 342, a second boss 343, and a third boss 344.

The body 341 is disposed on an upper surface of the insulator 320. The body 341 may extend along a circumference of the insulator 320. The first boss 342, the second boss 343, and the third boss 344 are disposed on the body 341. In addition, at least two grooves in which a coupling portion 440 is disposed may be formed in the body 341.

A pin 420 is disposed on the first boss 342. An opening corresponding to a thickness of the pin 420 is formed in the first boss 342.

The second boss 343 is spaced apart from the first boss 342. A second bent piece 412 is disposed in the second boss 343. An opening corresponding to a thickness of the second bent piece 412 is formed in the second boss 343. The second boss 343 is formed with two boss members spaced apart from each other with the opening interposed therebetween. The boss members may be in contact with both sidewalls of the fourth bent piece 414 to restrict movement of the fourth bent piece 414 in a radial direction. In this case, a groove into which the coupling portion 440 is inserted may be formed under the opening.

The third boss 344 is spaced apart from the second boss 343. A fourth bent piece 414 is disposed in the third boss 344. An opening corresponding to a thickness of the fourth bent piece 414 is formed in the third boss 344. The third boss 344 may be formed with two boss members spaced apart from each other with an opening interposed therebetween. The boss member may be in contact with the both sidewalls of the fourth bent piece 414 to restrict movement of the fourth bent piece 414 in the radial direction. In this case, a groove into which the coupling portion 440 is inserted may be formed under the opening. In addition, the third boss 344 may be disposed toward the outside toward a hook 430 of the stator 300. The guide 340 fixes a coupling position of the terminal 400 and guides the coupling portion 440 to be inserted into the groove of the body 341 to facilitate assembly of the terminal 400 on the stator 300.

The protrusion 350 may protrude from an outer circumference of the insulator 320 in the radial direction. The protrusion 350 may be provided as a plurality of protrusions 350. In this case, the coil 330 may be disposed along the outer circumference of the insulator 320. The coil 330 may be disposed to form a plurality of rows in a shaft direction. The first phase coil, the second phase coil, and the third phase coil of the coil 330 may be disposed along different rows from each other. In this case, the protrusions 350 support a lower end of the coil 330. The protrusions 350 may form a plurality of stages in an axial direction of the insulator 320 to correspond to the coil 330. A length of the protrusion 350 in the radial direction may be greater than a diameter of the coil 330. In this case, the protrusion 350 may fix a position of the coil 330 to be wound around the insulator 320.

FIG. 5 is an exploded perspective view illustrating the stator and the terminal, FIG. 6 is a plan view of FIG. 5, and FIG. 7 is a plan view illustrating a layout of the terminal.

Referring to FIGS. 5 to 7, the terminal 400 is disposed on the stator 300. The terminal 400 is connected to an upper side of the stator 300. The terminal 400 may be provided as three terminals 400, and three terminals 400 may be disposed at intervals of 120° around a stator center C. In this case, one terminal 400 is connected to a start end and a termination end of the coil 330. In addition, the terminal 400 may overlap the stator 300 in the shaft direction. This is to reduce interference between the terminal 400 and other components.

The terminal 400 may include an extension 410, a pin 420, a hook 430, and a coupling portion 440. In this case, the extension 410, the pin 420, the hook 430, and the coupling portion 440 may be integrally formed.

FIG. 8 is a side view illustrating the terminal, FIG. 9 is a front view illustrating the terminal, and FIG. 10 is a plan view illustrating the terminal.

Referring to FIGS. 8 to 10, the extension 410 is disposed in the circumferential direction of the insulator 320. A length of the extension 410 in the shaft direction may be greater than a thickness of the extension 410 in the radial direction. The extension 410 has a plurality of bent points. In this case, the extension 410 overlaps the stator 300 in the shaft direction.

The extension 410 may include a first bent piece 411, a second bent piece 412, a third bent piece 413, a fourth bent piece 414, and a fifth bent piece 415.

The first bent piece 411 is connected to the pin 420. The first bent piece 411 is perpendicular to the pin 420.

The second bent piece 412 is bent and extends inward from the first bent piece 411. In this case, the first bent piece 411 and the second bent piece 412 form an internal angle d in an inward direction. Here, when an angle at a bent position is less than or equal to 180°, the angle is referred to as an internal angle, and when an angle at the bent position is greater than or equal to the 180°, the angle is referred to as an external angle. In this case, the internal angle d may be 160° to 175°.

The third bent piece 413 is bent and extends inward from the second bent piece 412. In this case, the second bent piece 412 and the third bent piece 413 form an internal angle c in the inward direction. The internal angle c may be 145° to 155°.

The fourth bent piece 414 is bent and extends outward from the third bent piece 413. In this case, the third bent piece 413 and the fourth bent piece 414 form an internal angle b in an outward direction. The internal angle b may be 160° to 170°.

The fifth bent piece 415 is bent inward and extends upward from the fourth bent piece 414. In this case, the fourth bent piece 414 and the fifth bent piece 415 form an internal angle a in the inward direction. The internal angle a may be 120° to 135°. A lower end of the fifth bent piece 415 is positioned to be higher than an upper end of the extension 410. In this case, the fifth bent piece 415 may have a "1" shape. In this case, while the stator 300 rotates, a plurality of bent portions of the extension 410 may be hooked on the guide 340. Accordingly, a restriction force against the terminal 400 in a rotation direction of the stator 300 can be increased.

The pin 420 is disposed on one end of the extension 410. The pin 420 protrudes upward from the extension 410. The pin 420 is electrically connected to a power source.

The hook 430 extends to the other end of the extension 410. The coil 330, which passes from the first body portion 321A to the second body portion 321B, passes through the hook 430. In this case, the coil 330 is in contact with one side of the hook 430. In addition, the hook 430 is electrically connected to a portion of the coil which passes through the hook 430. In this case, a width of the hook 430 may be greater than a thickness of the hook 430 in the radial direction.

The hook 430 may be disposed adjacent to the first body portion 321A and the second body portion 321B. In this case, a reference line L1 connecting the stator center C and a width center of the hook 430 is disposed between a reference line L2 connecting the stator center C and a width center of the first body portion 321A and a reference line L3 connecting the stator center C and a width center of the second body portion 321B. In addition, the hook 430 may be disposed to be closer to the first body portion 321A than the second body portion 321B.

The hook 430 may include a first region 431, a second region 432, and a third region 433.

The first region 431 extends from the lower end of the fifth bent piece 415.

The second region 432 is bent upward from the first region 431. In this case, a lower end of the second region 432 may be positioned to be higher than a lower end of the extension 410. A region of the coil 330 passing through the hook 430 is in contact with the second region 432. In addition, the region of the coil 330 is fused to the second region 432. Accordingly, since the coil 330 is fused thereto in a state in which the coil is hooked on the terminal 400, an arrangement of the coil 330 is easy, and an additional process for arranging positions of the coil 330 and the terminal 400 may be omitted.

The third region 433 extends from an upper end of the second region 432. The third region 433 has an end positioned to be higher than the upper end of the extension 410. In this case, an outer side of the coil 330 passing through the terminal 400 is restricted by the fifth bent piece 415 and the first region 431 in the radial direction. In addition, an inner side of the coil 330 is restricted by the second region 432 and the third region 433 in the radial direction. Particularly, since the end of the third region 433 is positioned to be higher than the upper end of the extension 410, the coil 330 may be prevented from leaving toward the insulator 320. The terminal 400 may improve a restriction force against the coil 330 in a centrifugal direction.

The coupling portion 440 vertically extends from a lower side of the extension 410. The coupling portion 440 may be provided as a plurality of coupling portions 440. For example, two coupling portions 440 may be provided. The plurality of coupling portions 440 are spaced apart from each other in the circumferential direction. In this case, at least one or more bent portions of the extension 410 may be positioned between the plurality of coupling portions 440 in the circumferential direction. In this case, at least one of boundaries between the first bent piece 411 and the second bent piece 412, between the second bent piece 412 and the third bent piece 413, and between the third bent piece 413 and the fourth bent piece 414 may be disposed between one coupling portion 440 and another coupling portion 440. In this case, each of the boundaries between the first bent piece 411, the second bent piece 412, the third bent piece 413, and the fourth bent piece 414 has a bent shape. In this case, the plurality of coupling portions 440 may extend from the second bent piece 412 and the fourth bent piece 414. That is, the boundaries between the second bent piece 412 and the third bent piece 413 and between the third bent piece 413 and the fourth bent piece 414 may be disposed between the plurality of coupling portions 440 in the circumferential direction. In addition, the plurality of coupling portions 440 may be disposed to have different arrangement angles in the circumferential direction. Accordingly, while the stator 300 rotates, the plurality of coupling portions 440 may be coupled to the body to prevent the terminal from moving in the centrifugal direction. In addition, the arrangement angles of the plurality of coupling portions 440 are different in the circumferential direction so that a fixing force of the terminal 400 can be increased in the circumferential direction, and even when an impact is applied to the terminal 400 in the circumferential direction, a bent portion of the terminal 400 is hooked on the guide 340 so that the terminal can be restricted from moving in the circumferential direction.

As described above, the motor according to one exemplary embodiment of the present invention has been described with reference to the accompanying drawings.

The above description is only an example describing a technological spirit of the present invention. Various changes, modifications, and replacements may be made by those skilled in the art within a range without departing essential characteristics of the present invention. Therefore, the embodiments disclosed above and the accompanying drawings are considered in a descriptive sense only and not to limit the technological scope, and the technological scope of the present invention is not limited by the embodiments and the accompanying drawings. The scope of the present invention should be interpreted by the appended claims and encompass all equivalents falling within the scope of the appended claims.

REFERENCE NUMERALS

100: SHAFT
200: ROTOR
300: STATOR
310: STATOR CORE
320: INSULATOR
321: BODY PORTION
321A: FIRST BODY PORTION
321B: SECOND BODY PORTION
322: CONNECTOR
330: COIL
340: GUIDE
350: PROTRUSION
341: BODY
342: FIRST BOSS
343: SECOND BOSS
344: THIRD BOSS
400: TERMINAL
410: EXTENSION
411: FIRST BENT PIECE
412: SECOND BENT PIECE
413: THIRD BENT PIECE
414: FOURTH BENT PIECE
415: FIFTH BENT PIECE
420: PIN
430: HOOK
440: COUPLING PORTION

The invention claimed is:

1. A motor comprising:
a shaft;
a rotor coupled to the shaft;
a stator disposed outside the rotor; and
a terminal disposed on the stator,
wherein the stator includes a stator core, an insulator coupled to the stator core, and a coil wound around the insulator,
the insulator includes a connector and a plurality of body portions formed in a radial direction from the connector,
the terminal includes an extension disposed in a circumferential direction of the insulator, a pin protruding from one end of the extension, and a hook disposed on the other end of the extension,
the coil is provided as one continuous wire,
the coil is wound around the body portion,
the body portion includes a first body portion and a second body portion,
the coil passing from the first body portion toward the second body portion is hooked on the hook, and
the hook is electrically connected to a region of the coil hooked on the hook.

2. The motor of claim 1, wherein the extension overlaps the connector in a shaft direction.

3. The motor of claim 1, wherein the extension includes:
a first bent piece connected to the pin;
a second bent piece which is bent and extends inward from the first bent piece;
a third bent piece which is bent and extends inward from the second bent piece; and
a fourth bent piece which is bent and extends outward from the third bent piece.

4. The motor of claim 1, wherein:
the terminal is provided as three terminals; and
the terminals are disposed spaced apart from each other at angular intervals of 120° around a stator center (C).

5. The motor of claim 1, wherein a reference line (L1) connecting a center (C) of the stator and a width center of the hook is disposed between a reference line (L2) connecting the stator center (C) and a width center of the first body portion and a reference line (L3) connecting the stator center (C) and a width center of the second body portion.

6. The motor of claim 1, wherein the hook is disposed to be closer to the second body portion than the first body portion.

7. The motor of claim 1, wherein the hook includes:
a first region extending from a lower end of the extension;
a second region bent upward from the first region; and
a third region which extends from the second region and has an end positioned at a higher level than an upper end of the extension,
wherein the coil is disposed on the second region.

8. The motor of claim 7, wherein a lower end of the second region is positioned at a higher level than the lower end of the extension.

9. The motor of claim 8, wherein the coil is fused to the second region.

10. The motor of claim 3, wherein:
the insulator includes a guide having an opening in an upper portion of the guide; and
the extension is disposed on the guide.

11. The motor of claim 10, wherein the guide includes:
a second boss disposed on the connector; and
a third boss disposed to be spaced apart from the second boss in the circumferential direction,
wherein the second bent piece is disposed in the second boss, and
the fourth bent piece is disposed in the third boss.

12. The motor of claim 11, wherein the third boss is disposed to be spaced away from a center of the stator in a direction toward the hook.

13. The motor of claim 3, wherein:
the terminal includes a plurality of coupling portions extending from the extension in a direction opposite to a protruding direction of the pin; and
the connector includes a plurality of grooves coupled to the coupling portions.

14. The motor of claim 13, wherein:
the plurality of coupling portions are spaced apart from each other in the circumferential direction; and
at least one of boundaries between the first bent piece and the second bent piece, between the second bent piece and the third bent piece, and between the third bent piece and the fourth bent piece is disposed between the plurality of coupling portions in the circumferential direction.

15. The motor of claim 14, wherein each of the plurality of coupling portions extends from one of the second bent piece and the fourth bent piece.

16. The motor of claim 1, wherein:
the coil includes a region disposed on an outer circumference of the insulator;
the insulator includes a plurality of protrusions protruding from the outer circumference of the insulator in the radial direction; and
the protrusion supports a lower portion of the coil disposed on the outer circumference of the insulator in a shaft direction.

17. The motor of claim 16, wherein the plurality of protrusions do not overlap each other in the shaft direction.

18. The motor of claim 1, wherein the hook is open upward.

19. The motor of claim 1, wherein the hook is disposed at a more inner side than the extension in the radial direction.

20. The motor of claim 1, wherein the extension includes a plurality of bent pieces arranged in the circumferential direction.

* * * * *